(No Model.)

D. K. BARNHART.
BEE HIVE.

No. 251,157. Patented Dec. 20, 1881.

WITNESSES:
Theo. G. Hoster
C. Sedgwick

INVENTOR:
D. K. Barnhart
BY Munn & Co
ATTORNEYS.

UNITED STATES PATENT OFFICE.

DANIEL K. BARNHART, OF GAINES, PENNSYLVANIA.

BEE-HIVE.

SPECIFICATION forming part of Letters Patent No. 251,157, dated December 20, 1881.

Application filed September 17, 1881. (No model.)

*To all whom it may concern:*

Be it known that I, DANIEL K. BARNHART, of Gaines, in the county of Tioga and State of Pennsylvania, have invented certain new and useful Improvements in Bee-Hives, of which the following is a specification.

Reference is to be had to the accompanying drawings, forming part of this specification, in which similar letters of reference indicate corresponding parts in all the figures.

Figure 1:
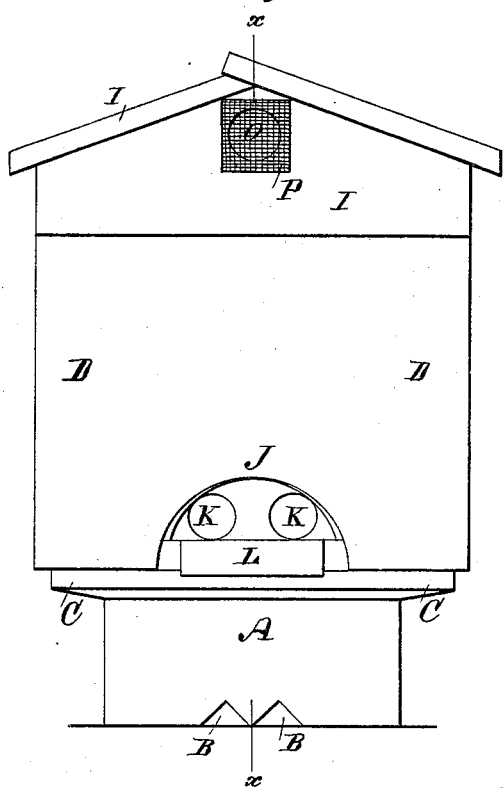
Figure 2:
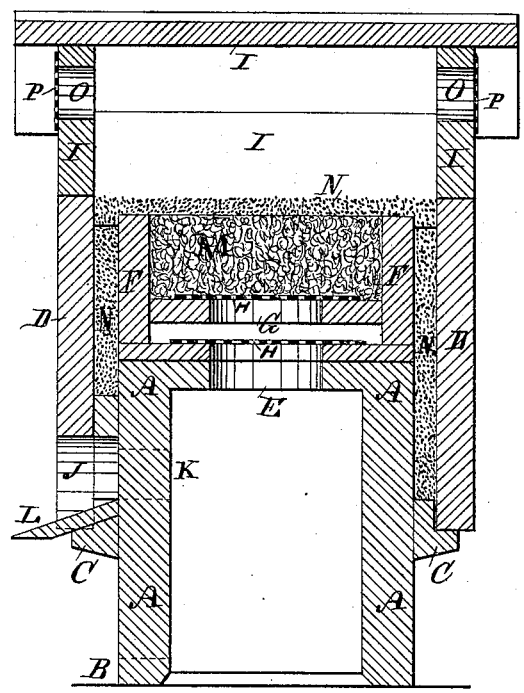
Figure 3:
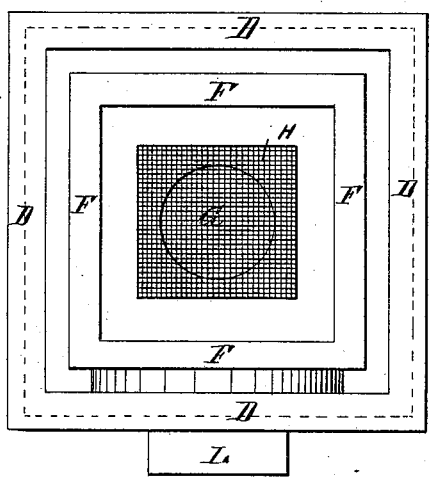

Figure 1 is a front elevation of my improvement. Fig. 2 is a sectional side elevation of the same, taken through the line $x\ x$, Fig. 1. Fig. 3 is a plan view of the same with the cover removed.

The object of this invention is to keep bees warm and dry in winter and cool in summer.

A represents an ordinary bee-hive, which has apertures B in the lower edge of its front for the passage of the bees.

To the middle part of the outer side of the hive A are attached cleats C, which are rabbeted upon their upper sides at a distance of about half an inch from the said hive A, as shown in Fig. 2, to receive the lower edge of the case D, that incloses the upper part of the said hive A. The case D is made so much larger than the hive A as to leave a space or chamber about half an inch wide between the said case and hive, as shown in Figs. 2 and 3.

In the top of the hive A are formed one or more apertures, E, through which the warm moist air from the said hive A passes up, and which serves as passage-ways for the bees to the surplus-honey boxes when honey-boxes are used.

F is a box of the same length and width as the hive A, and which is placed upon the top of the said hive A. The box F is made open at the top, and has apertures G in its bottom corresponding in number, size, and position with the apertures E in the top of the hive A. The bottom of the box F is made double, the parts being placed at a little distance apart, and the aperture G through each part is covered with wire-gauze H, as shown in Fig. 2, to prevent the bees from having access to the packing placed in the said box F, as hereinafter described.

I is the cover which fits upon the upper edge of the case D.

In the lower edge of the front of the case D is formed a semicircular aperture, J, to expose the apertures K, formed through the front of the hive A, to serve as bee-passages.

To the upper side of the cleat C, beneath the apertures J K, is attached a small inclined board, L, to form a platform for the bees to alight upon and take flight from.

With this construction, when the bees are to be protected from cold the cover I is removed, the box F is filled with wool M, or other suitable absorbent material, and placed upon the top of the hive A, and the space between the case D and the hive A and box F is filled with sawdust N, a layer of the sawdust N being spread over the top of the box F and wool M. With this arrangement the sawdust N keeps off the cold, and the wool M absorbs the moisture from the warm air that rises from the hive A and keeps the said moisture from condensing and trickling back into the said hive A, the warm air rising into the space below the cover I and escaping through the ventilating-openings O in the ends of the said cover, which openings O should be covered with wire-gauze P, so that the bees will be kept warm and dry. When the bees are to be protected from heat the cover I, case D, and box F, and the sawdust N are removed, and honey-boxes can be placed upon the top of the hive A. The case D and cover I are then put back, and the hive is ready for summer use.

With this arrangement the upper part of the hive A and the honey-boxes, when used, are surrounded by an air-chamber, which protects the bees from the heat of the sun.

Having thus fully described my invention, I claim as new and desire to secure by Letters Patent—

The combination, with the hive A, having the top aperture, E, the case D, and the cover I, of the box F, having a double bottom, provided with two gauze-covered apertures, the wool in the space above the upper gauze and the sawdust on the top and sides, whereby the bees are kept warm, ventilation allowed, and moisture absorbed, as described.

DANIEL K. BARNHART.

Witnesses:
AARON A. SMITH,
CHARLES HURLBURT.